(12) United States Patent
Pearce

(10) Patent No.: US 6,365,845 B1
(45) Date of Patent: Apr. 2, 2002

(54) SANITARY WEIGHING MACHINE

(75) Inventor: Larry N. Pearce, Oak Park, IL (US)

(73) Assignee: Triangle Package Machinery Company, Chicago, IL (US)

(*) Notice: Subject to any disclaimer, the term of this patent is extended or adjusted under 35 U.S.C. 154(b) by 0 days.

(21) Appl. No.: 09/440,743

(22) Filed: Nov. 16, 1999

(51) Int. Cl.$^7$ ............... G01G 19/387; G01G 21/28
(52) U.S. Cl. ............... 177/25.18; 177/238; 177/180
(58) Field of Search .............. 177/25.18, 124, 177/126, 238, DIG. 11, 180

(56) References Cited

U.S. PATENT DOCUMENTS

| | | | |
|---|---|---|---|
| 4,538,693 A | * 9/1985 | Klopfenstein et al. | 177/25 |
| 4,630,695 A | * 12/1986 | Connors et al. | 177/1 |
| 4,850,443 A | * 7/1989 | Bergholt et al. | 177/188 |
| 4,901,807 A | * 2/1990 | Muskat et al. | 177/25.18 |
| 5,038,875 A | * 8/1991 | Kitagawa et al. | 177/25.18 |
| 5,258,580 A | * 11/1993 | Bergholt | 177/58 |
| 5,258,581 A | * 11/1993 | Pearce et al. | 177/25.18 |
| 5,340,949 A | * 8/1994 | Fujimura et al. | 177/25.18 |
| 5,379,923 A | * 1/1995 | Sagastegui et al. | 222/181 |
| 5,545,856 A | * 8/1996 | Stapp et al. | 177/25.18 |
| 5,773,765 A | * 6/1998 | Sashiki et al. | 177/25.12 |
| 5,959,258 A | * 9/1999 | Howard | 177/25.18 |
| 5,967,294 A | * 10/1999 | Patterson et al. | 198/763 |
| 6,037,549 A | * 3/2000 | Weck | 177/25.18 |

* cited by examiner

Primary Examiner—Randy W. Gibson
(74) Attorney, Agent, or Firm—Brinks Hofer Gilson & Lione

(57) ABSTRACT

A combination weighing machine chassis that is comprised of an enclosed hollow support member having an inner surface upon which the drives and controls for the components of the product batch handling units are carried. There are openings formed in the hollow support member that include seals through which the necessary drives and controls extend. As a result, components of the product batch handling units, such as the vibrating trays, chambers and buckets, can be removed for cleaning and the outer surface of the hollow support member can also be cleaned. The operating components are now housed in a closed compartment where they are protected from contamination by air and water borne debris such as oil and food, and the entire weighing machine can now be conveniently washed down and thoroughly cleaned. The vibrator mechanisms for the feeder trays are suspended by extension coil springs from the inner surface of the top portion of the enclosed hollow support member. This provides an improved mounting arrangement for the vibrator mechanism and diminishes the vibrations that are imparted to the other components of the weighing machine.

16 Claims, 3 Drawing Sheets

SANITARY WEIGHING MACHINE

BACKGROUND OF THE INVENTION

This invention is an improvement on combination weighing machines of the type that are disclosed in U.S. Pat. Nos. 4,630,695, 4,901,807, 5,258,580 and 5,258,581. These prior art machines, used mainly in the food industry, are controlled by microprocessors and function at tremendous speeds. In these prior art combination weighing machines, a target package weight is preselected. Fractional amounts of the target package weight, referred to as product batches, are metered through a plurality of product batch handling units. Each separate product batch handling unit includes a set of product batch handling devices, such as a feeder tray, an accumulation chamber and a weighing mechanism. As disclosed in the above prior art U.S. Patents, product batch handling units can include additional product batch handling devices, for example holding chambers. Each weighing mechanism weighs the product batch that has been metered to it and stores the identity and weight of the individual batch. The microprocessor then calculates how the weighed batches can be combined to best meet the target package weight. After the best combination has been selected, the product batches of the selected product batch handling units are discharged into a collecting hopper. The product batch handling units that were discharged are then filled with new product and the process is repeated. This is a well known process and reference may be made to the above identified patents for a more detailed disclosure of such apparatus. U.S Pat. Nos. 4,63,695, 4,901,807, 5,258,580 and 5,258,581 are hereby incorporated by reference as a part of this disclosure.

As is best illustrated in FIG. 5 of U.S. Patent No. 5,258,281, the mechanisms for imparting movement to the distributor, vibration to the feeder tray and the weigh cells for the weighing mechanism are all carried by a horizontal plate which is part of the machine flame. This horizontal plate and the operating mechanisms carried thereby are open to the environment surrounding the weighing machine. Although the trays, chambers and buckets are mounted through quick attach connections which allow them to be disconnected and thoroughly cleaned it is difficult to maintain the support area for the operating mechanisms clean.

Although food articles being processed by combination weighing machines does not have direct contact with the operating mechanisms or their support areas, it is important to provide a clean environment for the entire food processing area. For this reason, it is important that the operating components area be protected to avoid contamination to the food being processed.

BRIEF SUMMARY OF THE INVENTION

To achieve these and other objectives, the present invention provides for a new and unique combination weighing machine chassis that is comprised of an enclosed hollow support member having an inner surface upon which the operating components are carried. There are openings formed in the hollow support member, including seals, through which the necessary drives and controls extend. Thus, air and water carried contaminates do not reach the operating components. As a result of this construction, when the trays, chambers and buckets are removed for cleaning, the outer surface of the hollow support member can be easily cleaned. The continuous flat outer surface of the hollow support member is accessible and does not have cracks and crevasses that are difficult to clean.

Another advantage of this unique combination weighing machine chassis is that the operating components are now housed in a closed compartment where they are protected from contamination by air and water borne debris such as oil and food.

Still another advantage of this unique combination weighing machine chassis is that the vibrator mechanism for the feeder tray is resiliently suspended from the top portion of the hollow support member which provides an improved vibrator mounting arrangement.

DETAILED DESCRIPTION OF THE PREFERRED EMBODIMENT

Figure 1:
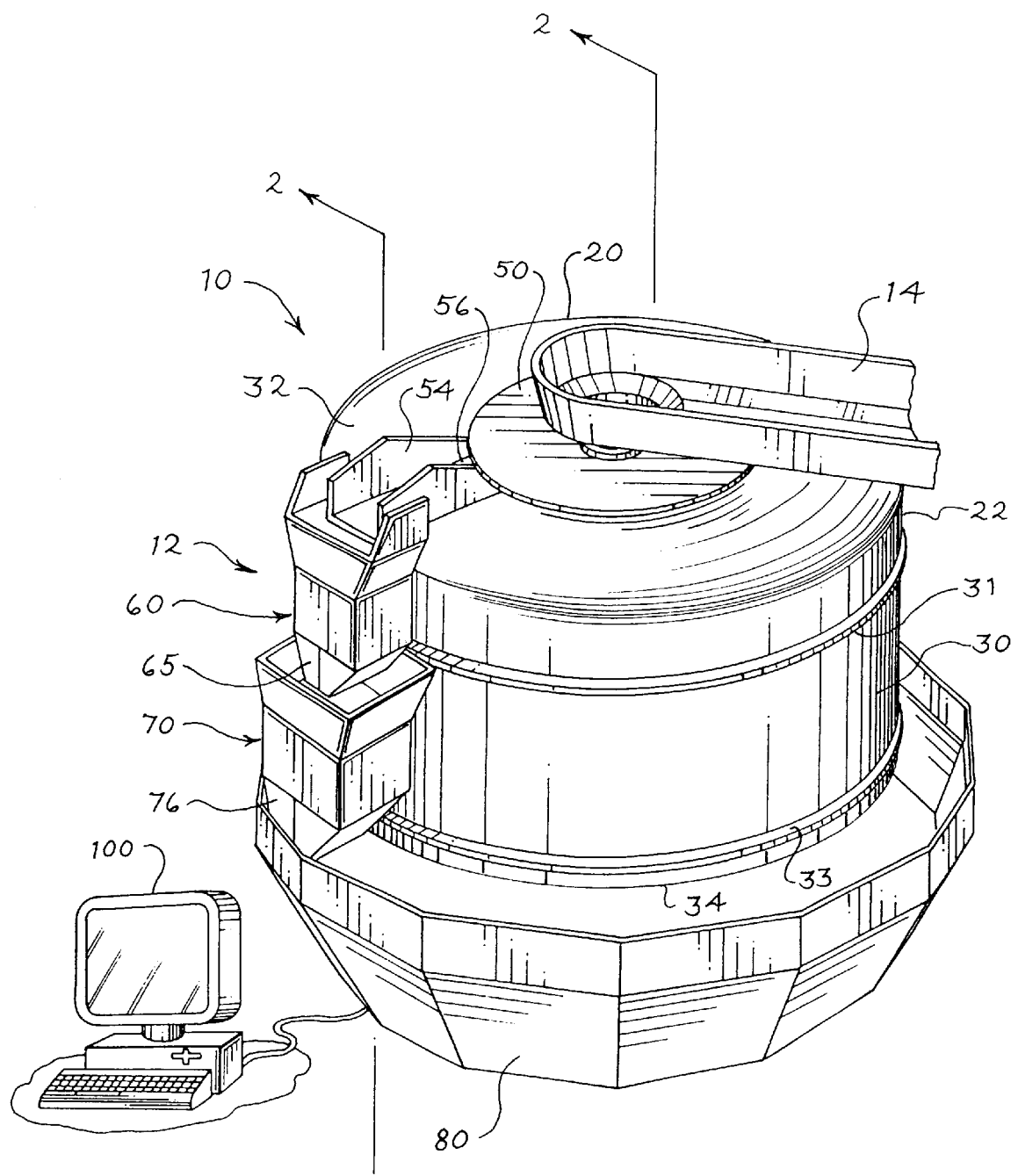
FIG. 1 is a perspective view of a combination weighing machine having only a single product batch handling unit mounted thereon.
Figure 2:
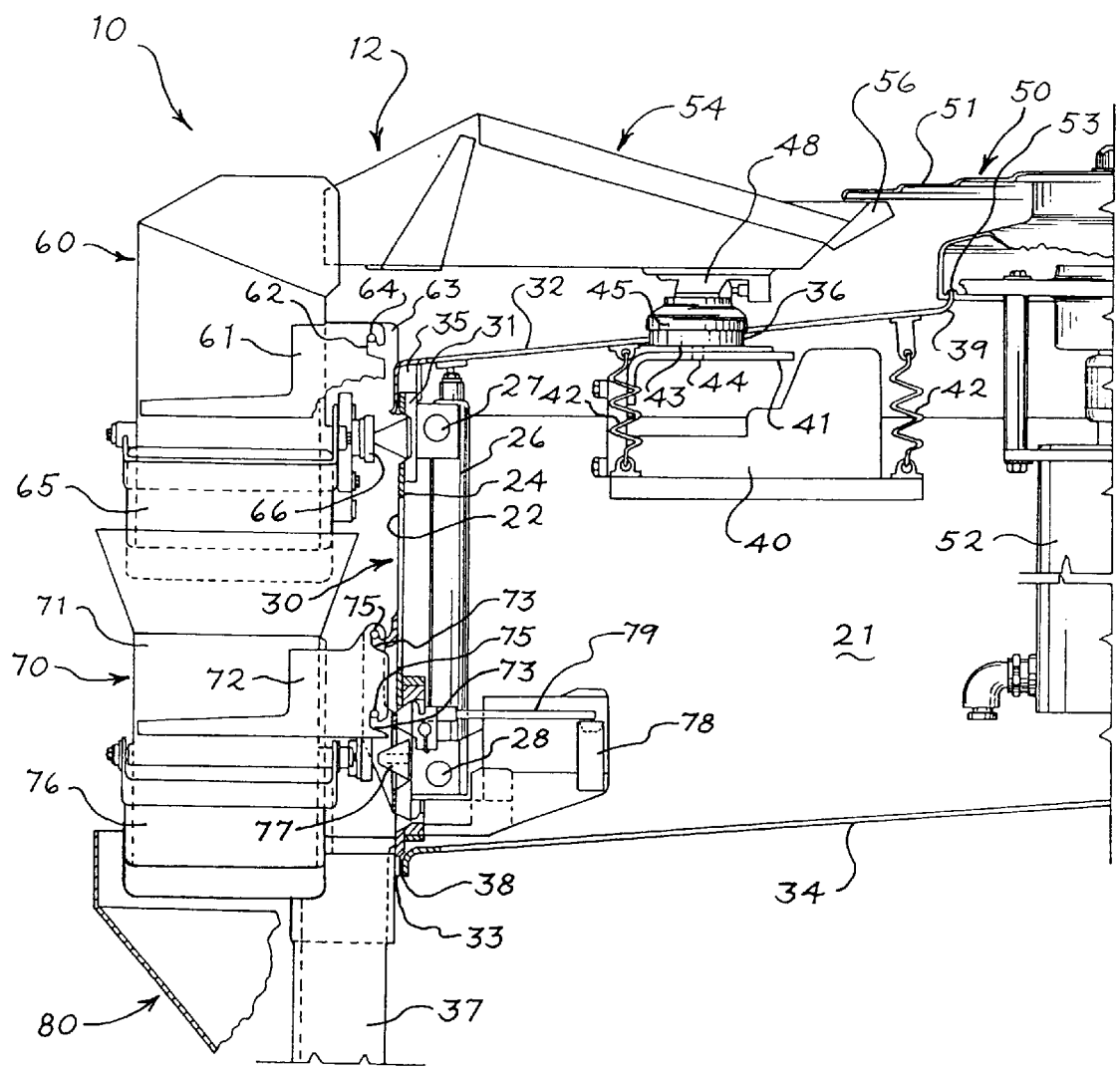
FIG. 2 is a cross section view taken along lines 2—2 of FIG. 1.

FIG. 1 is a perspective view of the hollow support member 20 which, in accordance with this invention functions as the chassis or frame for a combination weighing machine 10. FIG. 1 shows a discharge spout 14 that feeds product from an external bulk product source, a distributor 50, one of the product batch handling units 12, a discharge chute 80 and the machine's microprocessor 100. The product batch handing unit 12 that is shown is comprised of a feeder tray 54, an accumulator mechanism 60 and a weighing mechanism 70. The mechanism by which the accumulator mechanism 60 and weighing mechanism 70 are mounted on the hollow support member are shown in FIG. 2 but are not shown in FIG. 1. The discharge spout 14 is located such that a stream of bulk product is fed to and deposited near the center of the machine's distributor 50. The feed mechanism for the discharge spout 14 can be cycled on and off in response to signals from the microprocessor 100. The operation of the various components of the combination weighing machine 10 and the discharge spout 14 are automated and are controlled by the microprocessor 100.

The hollow support member 20 has an outer surface 22 and inner surface 24 (see FIG. 2) and is formed of material that is impervious to the passage of air and water. In the preferred embodiment the hollow support member 20 is formed of ⅛ inch steel. A heavy gauge steel is used to enable the hollow support member to function as the machine's chassis or frame. As a result of utilizing the hollow support member as the chassis, the usual post and plates of conventional machines, that functioned as the chassis or frame, have been eliminated. In accordance with this invention, all of the weighing machine's operating components are now face-mounted on the inner surface 24 of the hollow support member.

The hollow support member 20 has a generally cylindrical mid-portion 30 that is closed along an upper edge 31 by a generally horizontal, dome-shaped, top portion and along a bottom edge 33 by a bottom portion 34. The inner surface 24 of the hollow support member 20 defines an enclosed hollow chamber 21 within said hollow support member 20.

There is a vibration and moisture isolation member 35 along the upper peripheral edge 31 of the generally cylindrical mid-portion 30 and the adjacent generally dome-shaped top portions 32 to prevent the passage of moisture and other debris into the enclosed hollow chamber 21 and to control vibrations of the portions. Four expandable cylinders 26, (only one shown in FIG. 2) that are energized by air or oil, are anchored, at 27 and 28, to the inner surface 24 of the generally cylindrical mid-portion 30. The free ends of the rods 29 are secured to the generally dome-shaped top portion 32. The cylinders 26 can be expanded, which elevates the dome-shaped top portion 32 along with all components carried thereby, to permit servicing of the machine's operating components that are carried by the inner surface 24 of the enclosed hollow chamber 21. The anchors 27 and 28 maintain the cylinders 26 in a vertical attitude to assure that the elevated top portion is retained horizontal and aligned with the mid-portion 30.

The generally dome-shaped top portion 32 has a central opening defined by a rim 39 along which is mounted a distributor 50.

The hollow support member 20 has a plurality of support legs 37 that can, for example, function to support combination weighing machine 10 over a form, fill and seal machine of the type shown in U.S. Pat. No. 5,715,656. The form, fill and seal machine receives and bags the product that has been metered to the collecting mechanism 80.

The bottom portion 34 is seam welded along the bottom edge 33 of the generally cylindrical mid-portion 30. Drain holes 38 can be provided along the seam weld adjacent each leg 37.

In the preferred embodiment of the combination weighing machine 10, the distributor 50 is in the form of a flat nutating disc 51 of the type disclosed in U.S. Pat. No. 5,258,581. However, it should be understood that other types of distributors could be used with this invention. As best seen in FIG. 2, nutating motion is imparted to the distributor 50 by an electric motor 52. The nutating distributor disc 51 imparts a radial outward directional force to product that has been deposited on its upper surface by the discharge spout 14. The electric motor 52, that drives distributor 50, is controlled by the microprocessor 100. An annular vibration and moisture seal 53 is provided between the rim 39 of the generally dome-shaped top portion 32 and the bottom surface 55 of the distributor 50 to prevent the passage of moisture and other debris into the enclosed hollow chamber 21 and to control vibrations between the members.

A plurality of radially extending feeder trays 54 are carried on the dome-shaped top portion 32 of the hollow support member 20. The feeder trays 54 are arranged such that their receiving ends 56 underlie the periphery of the distributor disc 51. As a result, the product that falls over the peripheral edge of distributor disc 51 is caught by the receiving ends 56 of the feeder trays 24. The feeder trays 54 are carried by vibrators 40. Vibrators 40 are resiliently supported by springs 42 that hang from the inner surface 24 of the dome-shaped top portion 32. As a result of suspending the vibrators 40 by springs 42 rather than securing them to plates that form a part of the machine frame less energy is transferred into the frame structure of the machine. This results in a more efficient system for vibrating the trays 54 and also diminishes undesirable vibrations to the machines frame structure. The vibrators 40 include post member 44, that is secured to a cantilevered arm 41 and supports the tray mounting mechanism 43. The tray mounting mechanism 43 extends through an opening formed in the dome-shaped top portion 30. A ring 36 is secured to the dome-shaped top portion 32 at this opening. An elastic boot seal 45 is secured to the upper portion of the tray mounting mechanism 43 and overlaps the upper portion of the ring 36. The elastic boot seal 45 functions to prevent the passage of debris into the enclosed hollow chamber 21. The feeder trays 54 are connected through quick detach mounting devices 48 to the tray mounting mechanism 43. The vibrators 40 are cycled on and off at appropriate times by the microprocessor 100.

Each accumulator 60 is removably supported on the outer surface 22 of the generally cylindrical mid-portion 30 and includes an individually controllable bottom opening door 65 which when opened discharges the contents of the accumulator into a weigh bucket 71. Each accumulator 60 has a pair of vertically oriented mounting plates 61 having bayonet type slots 62 formed therein. A corresponding pair of support plates 63, having, pins 64 secured thereto, are secured to the outer surface 22 of the generally cylindrical mid-portion 30. The accumulators 60 are supported by the pins 64 which engage in the bayonet slots 62. This arrangement causes the accumulators 60, as seen in FIG. 2, to slide vertically, into engagement with the door activator mechanism 66 that functions when energized by the microprocessor 100 to open the bottom opening door 65. This mounting arrangement allows the accumulators 60 to be readily removed by sliding them away from the door activator mechanism 66 and lifting the bayonet slots 62 off pins 64.

Each weighing mechanism 70 includes a weigh bucket 71 that is supported such that it can be removed from and re-hung, without tools, on the outer surface 22 of the generally cylindrical mid-portion 30. Each weigh bucket 71 includes a pair of vertically oriented mounting plates 72. Each mounting plate 72 has an upper and a lower bayonet slot 73. Cooperating pins 75 are carried on the outer surface 22 of the generally cylindrical mid-portion 30. Each weigh bucket is connected to a weigh cell 78, by actuating mechanism 79. Said weigh cell 78 is carried by the inner surface 24 of the generally cylindrical mid-portion 30. Each weigh bucket 71 includes individually controllable bottom opening doors 76 that when closed support the product. When the bottom opening doors 76 are opened, by door control mechanism 77, the contents of the weigh bucket 71 is discharged into the collecting mechanism 80.

Figure 3:
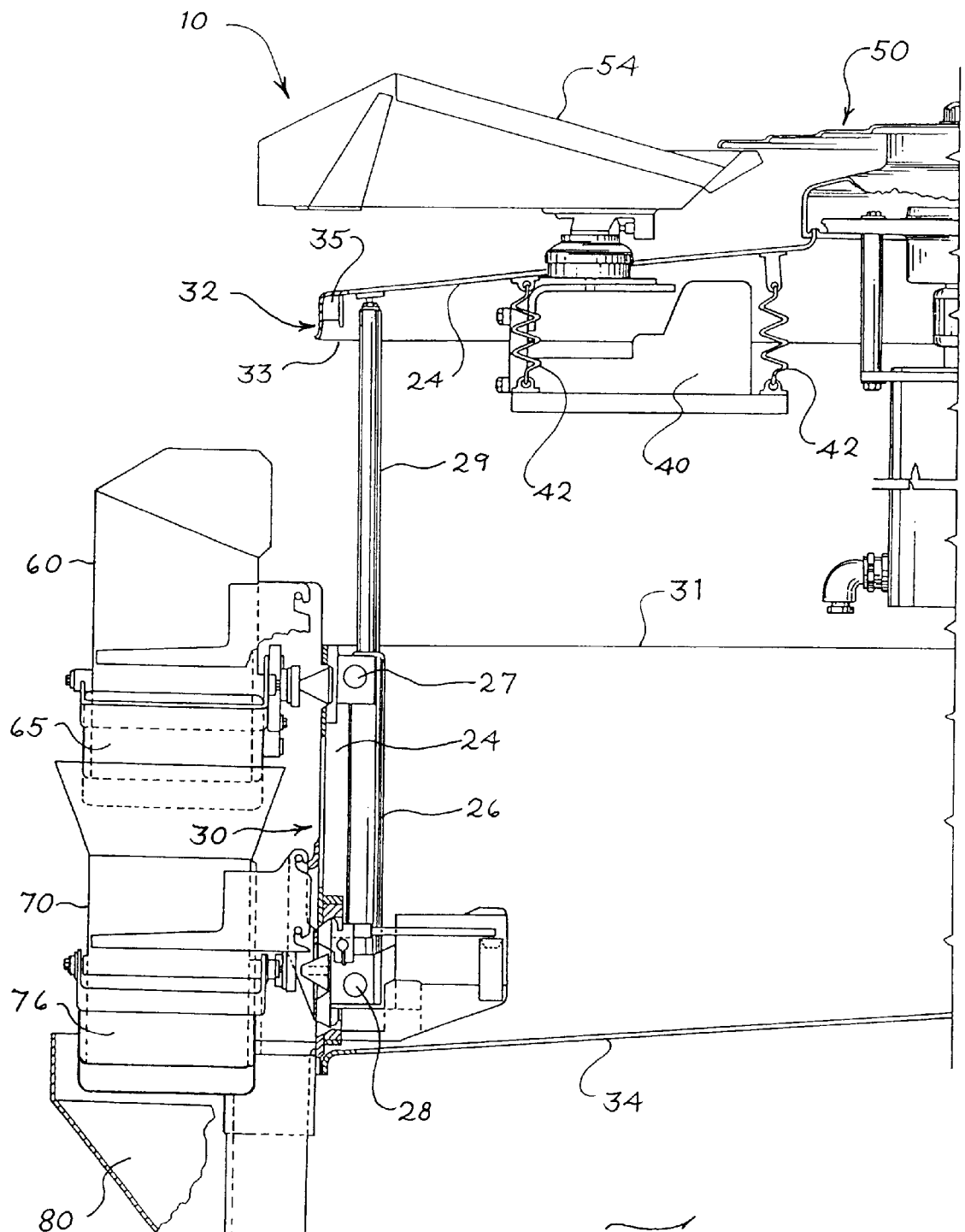
FIG. 3 is a cross section view, similar to FIG. 2, with the top portion raised by the expanded cylinders.

In FIG. 3, the cylinders 26 have been expanded and the generally dome-shaped top portion 32 has been raised off of the generally cylindrical mid-portion 30. With the top portion 32 raised, the vibrator 40, the drive for the distributor 50 and the controls for the accumulator 60 and weigh mechanism 70 that are carried by the inner surface 24 of the generally cylindrical mid-portion 30 are accessible to be serviced.

It should be understood that this invention can also be used with weighing machines having product batch handling units 12 that are comprised of components other than that disclosed herein. Also, the preferred embodiment of this invention has fourteen product batch handling units 12 spaced around the hollow support member 20. Only one of these product batch handling units 12 has been shown in FIG. 1 to better show the hollow support member 20. When all fourteen product batch handling units 12 are mounted on the hollow support member 20, very little of the hollow support member 20 is visible. This invention is equally applicable to weighing machines having other than fourteen product batch handling units.

The foregoing specification describes only preferred embodiments of the invention as shown. Other embodiments, beside the ones described above, may be articulated as well. The terms and expressions, therefore, serve only to describe the invention by example only and not to limit the invention. It is expected that others perceive differences which, while differing from the foregoing, do not depart from the spirit and scope of the invention herein described and claimed.

What is claimed is:

1. A weighing machine for providing a quantity of product having a predetermined weight, comprising:
   a hollow support member, having outer and inner surfaces, said hollow support member formed of material that is impervious to the passage of air and water, said hollow support member having a generally cylindrical mid-portion that can be closed along an upper edge by a generally dome-shaped top portion and is closed along a bottom edge by a bottom portion, said inner surface defining an enclosed hollow chamber within said hollow support member;
   a distributor overlaying and located centrally of said generally dome-shaped portion, said distributor having a peripheral edge over which product supplied to said distributor is discharged;
   a power drive for said distributor located within said enclosed hollow chamber and supported by said dome-shaped top portion, a drive opening formed in said dome-shaped top portion, said power drive extending through said drive opening and operatively connected to said distributor, a seal between said drive opening and said power drive for preventing debris laden air and water from entering said enclosed hollow chamber;
   a plurality of vibrating feeder trays, each overlaying said generally dome-shaped portion and arranged such that product discharged over the peripheral edge of said distributor falls into said plurality of vibrating feeder trays, said vibrating feeder trays radiate from said distributor and include a discharge at their outer edge;
   a power vibrator for each of said vibrating feeder trays, each of said power vibrators being resiliently supported from said inner surfaces of said dome-shaped top portion, vibrator openings formed in said hollow support member through which a portions of said power vibrators extend for operative connection to its associated vibrating feeder tray, seals between said vibrator openings and the portions of said power vibrator that extends through said vibrator opening for preventing debris laden air and water from entering said enclosed hollow chamber;
   an accumulator associated with each of said vibrating feeder trays carried on the outer surface of said generally cylindrical mid-portion of the hollow support member, said accumulators located such that product discharged from a vibrating feeder tray will fall into its associated accumulator, said accumulators having discharge openings that can be opened and closed by actuating mechanism, controls carried by said inner surface of said hollow support member for energizing said actuating mechanism;
   a weighing mechanism associated with each of said accumulators and carried by said generally cylindrical mid-portion of the hollow support member, each weighing mechanism includes a weighing bucket that is supported on said outer surface of said hollow support member such that product discharged from its associated accumulator will fall into the weigh bucket, weigh bucket mounting mechanism carried by the outer surface of said generally cylindrical mid-portion of the hollow support member, each weighing mechanism includes a weigh cell mounted on the inner surface of said generally cylindrical mid-portion of the hollow support member; and
   a collecting mechanism located to receive discrete amounts of product from any of said weigh buckets, consolidate it, and direct it to another location.

2. A weighing machine for providing a quantity of product having a predetermined weight, comprising:
   a hollow support member, having outer and inner surfaces, said hollow support member formed of material that is impervious to the passage of air and water, said hollow support member having a generally cylindrical mid-portion that can be closed along an upper edge by a generally dome-shaped top portion and is closed along a bottom edge by a bottom portion, said inner surface defining an enclosed hollow chamber within said hollow support member;
   a distributor overlaying and located centrally of said generally dome-shaped top portion, said distributor having a peripheral edge over which product supplied to said distributor is discharged;
   a plurality of product batch handling units, each product batch handling unit comprising a plurality of components, each of said components including a functional device that is supported on said outer surface of said hollow support member and an operative mechanisms that is located within said hollow chamber and is supported on said inner surface of said hollow support member, said functional device being interconnected to said operative mechanism through sealed openings formed in said hollow support member; and
   expandable cylinders secured at their base to said generally cylindrical mid-portion and at their movable free end to said generally horizontal top portion, such that when said expandable cylinders are expanded said generally horizontal top portion is elevated to permit servicing of operating components carried by said inner surface of said hollow support member.

3. A weighing machine as set forth in claim 2 that further comprises:
   a power drive for said distributor located within said enclosed hollow chamber and supported thereby.

4. A weighing machine as set forth in claim 2 in which a component of each of said product batch handling units is:
   a vibrating feeder tray, that overlays said generally dome-shaped top portion and is arranged such that product discharged over the peripheral edge of said distributor falls into the vibrating feeder tray, said vibrating feeder tray radiates from said distributor and includes a discharge at its outer edge;
   a power vibrator for said vibrating feeder tray that is resiliently supported from said inner surfaces of said hollow support member, vibrator opening formed in said hollow support member through which a portions of said power vibrators extend for operative connection to its associated vibrating feeder tray, seals between said vibrator opening and the portion of said power vibrator that extends through said vibrator opening for preventing debris laden air and water from entering said enclosed hollow chamber.

5. A weighing machine as set forth in claim 3 in which a component of each of said product batch handling units is:
   a vibrating feeder tray, that overlays said generally dome-shaped top portion and is arranged such that product discharged over the peripheral edge of said distributor falls into the vibrating feeder tray, said vibrating feeder tray radiates from said distributor and includes a discharge at its outer edge;

a power vibrator for said vibrating feeder tray that is resiliently supported from said inner surfaces of said hollow support member, vibrator opening formed in said hollow support member through which a portions of said power vibrators extend for operative connection to its associated vibrating feeder tray, seals between said vibrator opening and the portion of said power vibrator that extends through said vibrator opening for preventing debris laden air and water from entering said enclosed hollow chamber.

6. A weighing machine as set forth in claim 4 wherein:

said operative connection between a portion of said power vibrator and said vibrating feeder tray is a quick detach and attach connection.

7. A weighing machine as set forth in claim 5 wherein:

said operative connection between a portion of said power vibrator and said vibrating feeder tray is a quick detach and attach connection.

8. A weighing machine as set forth in claim 4 in which another component of each of said product batch handling units is:

an accumulator that is associated with said vibrating feeder tray, said accumulator is carried on the outer surface of said generally cylindrical mid-portion of the hollow support member and is located such that product discharged from said vibrating feeder tray falls into the associated accumulator, said accumulator having a discharge opening that can be opened and closed by actuating mechanism, an actuating mechanism control carried on said inner surface of said hollow support member for energizing said actuating mechanism.

9. A weighing machine as set forth in claim 5 in which another component of each of said product batch handling units is:

an accumulator that is associated with said vibrating feeder tray, said accumulator is carried on the outer surface of said generally cylindrical mid-portion of the hollow support member and is located such that product discharged from said vibrating feeder tray fall into the associated accumulator, said accumulator having a discharge opening that can be opened and closed by actuating mechanism, an actuating mechanism control carried on said inner surface of said hollow support member for energizing said actuating mechanism.

10. A weighing machine as set forth in claim 8 in which another component of each of said product batch handling units is:

a weighing mechanism associated with said accumulator, each weighing mechanism includes a weigh bucket that is located along the outer surface of said hollow support member such that product discharged from said accumulator will fall into its associated weigh bucket, weigh bucket mounting mechanism carried by the outer surface of said generally cylindrical mid-portion of the hollow support member, said weigh bucket having discharge openings that can be opened and closed by actuating mechanism, an actuating mechanism control carried on said inner surface of said hollow support member for energizing said actuating mechanism, said weighing mechanism includes a weigh cell mounted on the inner surface of said generally cylindrical mid-portion of the hollow support member, operable connections between said weigh bucket and said weigh cell for weighing and recording the weight of the product that has been received in said weigh bucket from said accumulator.

11. A weighing machine as set forth in claim 9 in which another component of each of said product batch handling units is:

a weighing mechanism associated with said accumulator, each weighing mechanism includes a weigh bucket that is located along the outer surface of said hollow support member such that product discharged from said accumulator will fall into its associated weigh bucket, weigh bucket mounting mechanism carried by the outer surface of said generally cylindrical mid-portion of the hollow support member, said weigh bucket having discharge openings that can be opened and closed by an actuating mechanism, an actuating mechanism control carried on said inner surface of said hollow support member for energizing said actuating mechanism, said weighing mechanism includes a weigh cell mounted on the inner surface of said generally cylindrical mid-portion of the hollow support member, operable connections between said weigh bucket and said weigh cell for weighing and recording the weight of the product that has been received in said weigh bucket from said accumulator.

12. A weighing machine as set forth in claim 10 in which said weighing machine further includes:

a collecting mechanism adapted to receive discrete amounts of product from any of said product batch handling units, consolidate it, and direct it to another location.

13. A weighing machine as set forth in claim 1 in which said weighing machine further includes:

a collecting mechanism adapted to receive discrete amounts of product from any of said product batch handling units, consolidate it, and direct it to another location.

14. A weighing machine for providing a quantity of product having a predetermined weight, comprising:

a hollow support member, having outer and inner surfaces, said hollow support member formed of material that is impervious to the passage of air and water, said hollow support member having a generally cylindrical mid-portion that can be closed along an upper edge by a generally dome-shaped top portion, said inner surface defining an enclosed hollow chamber within said hollow support member;

a plurality of product batch handling components, each of said components including a functional device that is supported on said outer surface of said hollow support member and an operative mechanisms that is located within said hollow chamber and is supported on said inner surface of said hollow support member, said functional device being interconnected to said operative mechanism through sealed openings formed in said hollow support member; and expandable cylinders secured at their base to said generally cylindrical mid-portion and at their movable free end to said generally horizontal top portion, such that when said expandable cylinders are expanded said generally horizontal top portion is elevated to permit servicing of operating components carried by said inner surface of said hollow support member.

15. A weighing machine for providing a quantity of product having a predetermined weight, comprising:

a hollow support member, having outer and inner surfaces, said hollow support member formed of material that is impervious to the passage of air and water, said hollow support member including a generally horizontal top portion;

a plurality of vibrating feeder trays, each overlaying said generally horizontal top portion;

a power vibrator for each of said vibrating feeder trays, each of said power vibrators being resiliently supported from said inner surfaces of said top portion, vibrator openings formed in said hollow support member through which a portions of said power vibrators extend for operative connection to its associated vibrating feeder tray, seals between said vibrator openings and the portions of said power vibrator that extends through said vibrator opening for preventing debris laden air and water from entering said hollow support member.

16. A weighing machine for providing a quantity of product having a predetermined weight, as set forth in claim 15 wherein said hollow support member includes a generally cylindrical mid-portion having an upper edge, said generally cylindrical mid-portion can be closed along its upper edge by said generally horizontal top portion;

expandable cylinders secured at their base to said generally cylindrical mid-portion and at their movable free end to said generally horizontal top portion, such that when said expandable cylinders are expanded said generally horizontal top portion is elevated to permit servicing of operating components carried by said inner surface of said hollow support member.

* * * * *

UNITED STATES PATENT AND TRADEMARK OFFICE
CERTIFICATE OF CORRECTION

PATENT NO.    : 6,365,845 B1
DATED         : April 2, 2002
INVENTOR(S)   : Larry N. Pearce It is certified that error appears in the above-identified patent and that said Letters Patent is hereby corrected as shown below:

Column 5,
Line 38, delete "a portions" and substitute -- a portion -- in its place.

Column 6,
Line 24, delete "mechanisms" and substitute -- mechanism -- in its place.
Line 53, delete "a portions" and substitute -- a portion -- in its place.

Column 8,
Line 25, delete "claim 1" and substitute -- claim 11 -- in its place.

Column 9,
Line 2, delete "a portions" and substitute -- a portion -- in its place.

Signed and Sealed this

Nineteenth Day of November, 2002

*Attest:*

*Attesting Officer*

JAMES E. ROGAN
*Director of the United States Patent and Trademark Office*